US007580042B2

(12) United States Patent
Chung et al.

(10) Patent No.: US 7,580,042 B2
(45) Date of Patent: Aug. 25, 2009

(54) SYSTEMS AND METHODS FOR STORING AND FETCHING TEXTURE DATA USING BANK INTERLEAVING

(75) Inventors: Young-Jin Chung, Seoul (KR); Kil-Whan Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 478 days.

(21) Appl. No.: 11/415,721

(22) Filed: May 2, 2006

(65) Prior Publication Data
US 2007/0052713 A1 Mar. 8, 2007

(30) Foreign Application Priority Data
Aug. 9, 2005 (KR) .................. 10-2005-0072930

(51) Int. Cl.
*G06F 12/02* (2006.01)
(52) U.S. Cl. ............... 345/566; 345/552; 345/554; 345/564; 345/571; 345/572; 345/581; 345/582; 345/608; 345/609
(58) Field of Classification Search .......... 345/608, 345/609, 554, 566, 570
See application file for complete search history.

(56) References Cited

U.S. PATENT DOCUMENTS

| 5,802,569 | A | 9/1998 | Genduso et al. | |
| 6,002,410 | A | 12/1999 | Battle | 345/513 |
| 6,104,413 | A | 8/2000 | Cheng et al. | 345/508 |
| 6,130,680 | A | 10/2000 | Cox et al. | 345/511 |
| 6,313,846 | B1 | 11/2001 | Fenney et al. | 345/552 |
| 6,353,438 | B1 | 3/2002 | Van Hook et al. | 345/552 |
| 6,462,747 | B1 * | 10/2002 | Oh | 345/552 |
| 6,557,080 | B1 | 4/2003 | Burger et al. | |
| 6,563,507 | B1 | 5/2003 | Ito | 345/569 |
| 6,604,175 | B2 | 8/2003 | Dawson | 711/133 |
| 6,741,256 | B2 * | 5/2004 | Emberling | 345/540 |
| 7,068,239 | B2 * | 6/2006 | Smith et al. | 345/2.1 |
| 2003/0038810 | A1 | 2/2003 | Emberling | 345/540 |

FOREIGN PATENT DOCUMENTS

| KR | 10-0204336 | 3/1999 |
| KR | 10-2000-0025609 | 5/2000 |
| KR | 2000-0062253 A | 10/2000 |
| KR | 10-2001-0027669 | 4/2001 |
| WO | 98/28695 A1 | 7/1998 |

* cited by examiner

*Primary Examiner*—Antonio A Caschera
(74) *Attorney, Agent, or Firm*—Mills & Onello, LLP (57) ABSTRACT

In systems and methods for graphic reproduction of an image including textural information, multiple rows or blocks of texture data can be retrieved from system memory in response to the single read command. In this manner, efficient use of system bus is achieved, and an increase in the texture cache hit ratio is realized, leading to more efficient system operation, and reduced system bus usage for texture data retrieval.

32 Claims, 8 Drawing Sheets

| SINFO[1] | SINFO[0] | Interleaving | V[3] | V[2] | V[1] | V[0] |
|---|---|---|---|---|---|---|
| 0 | 0 | No Interleaving | V[3] | V[2] | V[1] | V[0] |
| 0 | 1 | 2-bank Interleaving | V[3] | V[2] | V[1] | 0 |
| 1 | 0 | 4-bank Interleaving | V[3] | V[2] | 0 | 0 |
| 1 | 1 | 8-bank Interleaving | V[3] | 0 | 0 | 0 |

SYSTEMS AND METHODS FOR STORING AND FETCHING TEXTURE DATA USING BANK INTERLEAVING

RELATED APPLICATIONS

This application claims priority under 35 U.S.C. 119 to Korean Patent Application No. 10-2005-0072930, filed on Aug. 9, 2005, the content of which is incorporated herein by reference in its entirety.

FIELD OF THE INVENTION

The present invention relates to graphic systems and methods, and, more particularly, to graphic systems and methods that utilize a bank-interleaved texture data storage and retrieval process.

BACKGROUND OF THE INVENTION

Three-dimensional graphic technology is commonly employed in modern graphic systems. In a three-dimensional graphic system, a three-dimensional object is represented in terms of three coordinates (height, width, and length), and the image is displayed on a two-dimensional monitor. Such technology allows the object to be more realistically represented on the monitor.

A graphic object to be displayed is commonly configured as a series of vertices, each containing image information such as color. To achieve a more realistic reproduction of the object in the image scene, a process referred to as texture mapping is utilized. In a texture mapping process, a texture image is mapped onto a surface of an object, or vertex of the object, to vary the displayed color characteristics, and thereby provide a more realistic three-dimensional representation of the object. A texture represents a type of image, such as a stripe pattern, checkerboard pattern, or more complex patterns, that characterize the object in a natural manner.

Texture data commonly takes the form of a set of texels that are collectively stored in a texture memory. A texel is a smallest unit of graphical element in a two-dimensional texture map that is used to render a three-dimensional object. A texel represents a single color combination at a specific position in the texture map.

Texture mapping is both computationally intensive and memory access intensive, and can generally be categorized according to the type of texture filtering that is performed. In a bilinear filtering process, 4 texels are fetched from memory for texture filtering that is performed. In a bilinear a trilinear filtering process, 8 texels are fetched from memory for texture mapping of each screen pixel. Each pixel displayed on the two-dimensional image screen is a combination of the associated pixel information, or pixel color, and the associated texel information, or texel color. Texture mapping therefore introduces an additional computational layer to the image display process.

Within a single application, it is common to have textural information at various levels of precision, or bit formats. For example, within the same application, first textural information can be 16 bits wide, second textural information can be 32 bits wide and third textural information can be 64 bits wide. In general, a larger bit format results in a more realistic display of the texture representation, but is more computationally expensive.

Further, within a single application, the textural information can also be stored according to different storage patterns. For example, in a stride pattern, sequential textural data are stored sequentially in memory. In a twiddle pattern, sequential textural data are stored on adjacent rows according to a known twiddle format. The twiddle format is an especially attractive format for a bilinear textural filtering process, because bilinear filtering requires access to 4 neighboring texels, and the twiddle format allows access to the 4 neighboring texels in a single burst access.

In contemporary graphic display systems, the block size of texture cache determines the number of individually addressable data elements that are retrieved from memory upon each memory access, or fetch. Therefore, for each instance that texture data are fetched from memory, a fixed number of data elements are returned, and the data are returned according to a fixed storage pattern, for example either stride or twiddle patterns. Each fetch by the texture cache from system memory requires exclusive use of the system bus, to transfer address and command signals from the texture cache to the memory controller. Excessive use of the system bus can have an adverse effect on overall system performance.

SUMMARY OF THE INVENTION

The present invention is directed to systems and methods for graphic reproduction of an image in which texture cache accesses system memory in a manner that minimizes system bus usage. In the present invention, texture data stored in system memory is interleaved among a plurality of memory banks. In this manner, a single fetch command can be transmitted to retrieve multiple blocks of data among the multiple banks of system memory. Efficient use of memory access time is provided, and an increase in the texture cache hit ratio is realized, leading to more efficient system operation, and reduced system bus usage required for texture data retrieval.

In one aspect, the present invention is directed to a graphics accelerator in a video graphics system. The graphics accelerator comprises: a graphic processing unit that receives vertex data from an external source, that performs texture processing on the vertex data and that generates a requested address of requested texture data based on the vertex data; and an address modifier unit that receives the requested address corresponding to the requested texture data to be accessed in a system memory from the graphic processing unit to perform the texture processing, the system memory having multiple individually accessible memory banks in which texture data are stored in an interleaved arrangement, the address modifier converting the requested address to generate a converted requested address that is transmitted to access multiple banks of the system memory such that requested texture data corresponding to the requested address are retrieved, and such that additional texture data from the other memory banks in the interleaved arrangement are retrieved.

In one embodiment, the graphics accelerator further comprises a texture cache unit that receives the requested address and examines its contents for texture data corresponding to the requested address, and, in the event that the texture data corresponding to the requested address are present in the texture cache, the texture data are retrieved from the texture cache unit and returned to the graphics processing unit.

In another embodiment, the texture processing unit, further, in the event that the texture data corresponding to the requested address are not present in the texture cache, initiates a fetch of texture data corresponding to the requested address from the system memory to retrieve the texture data corresponding to the requested address to the texture cache unit, the address modifier converting the requested address to generate the converted requested address that is transmitted to retrieve texture data from the multiple banks of the system memory.

In another embodiment, the converted requested address indicates a starting bank of the interleaved arrangement of the memory banks of the system memory at which to retrieve texture data.

In another embodiment, the texture data are arranged in the system memory in a texture data map according to rows and columns, the rows being indexed by a row coordinate and the columns being indexed by a column coordinate. In another embodiment, the requested address corresponds to at least one texture data element of a row of the texture data map and wherein texture data elements of neighboring rows of the texture data map are required for the texture processing. In another embodiment, the interleaved arrangement is configured such that sequential adjacent rows of the texture data map are stored in sequential memory banks of the system memory.

In another embodiment, the texture processing comprises texture filtering and texture blending operations using the retrieved texture data.

In another embodiment, the texture filtering operation comprises one of bilinear and trilinear filtering operations.

In another embodiment, the address modifier unit further receives memory bank information that indicates a number of the memory banks in the system memory that are interleaved.

In another embodiment, the memory bank information is stored in a programmable register that is programmable by the external source over a system bus to which the graphics accelerator is coupled.

In another aspect, the present invention is directed to a video graphics system. The system comprises: a processor that generates image data including texture information; a system memory including multiple individually accessible memory banks in which texture data are stored in an interleaved arrangement; and a graphics accelerator unit in communication with the processor and the system memory via a system bus. The graphics accelerator unit comprises: a graphic processing unit that receives vertex data from the processor, that performs texture processing on the vertex data and that generates a requested address of requested texture data based on the vertex data; and an address modifier unit that receives the requested address corresponding to the requested texture data to be accessed in the system memory from the graphic processing unit to perform the texture processing, the address modifier converting the requested address to generate a converted requested address that is transmitted to access multiple banks of the system memory such that requested texture data corresponding to the requested address are retrieved, and such that additional texture data from the other memory banks in the interleaved arrangement are retrieved.

In one embodiment, the system further comprises a texture cache unit that receives the requested address and examines its contents for texture data corresponding to the requested address, and, in the event that the texture data corresponding to the requested address are present in the texture cache, the texture data are retrieved from the texture cache unit and returned to the graphics processing unit.

In another embodiment, the texture processing unit, further, in the event that the texture data corresponding to the requested address are not present in the texture cache, initiates a fetch of texture data corresponding to the requested address from the system memory to retrieve the texture data corresponding to the requested address to the texture cache unit, the address modifier converting the requested address to generate the converted requested address that is transmitted to retrieve texture data from the multiple banks of the system memory.

In another embodiment, the converted requested address indicates a starting bank of the interleaved arrangement of the memory banks of the system memory at which to retrieve texture data.

In another embodiment, the texture data are arranged in the system memory in a texture data map according to rows and columns, the rows being indexed by a row coordinate and the columns being indexed by a column coordinate. In another embodiment, the requested address corresponds to at least one texture data element of a row of the texture data map and wherein texture data elements of neighboring rows of the texture data map are required for the texture processing. In another embodiment, the interleaved arrangement is configured such that sequential adjacent rows of the texture data map are stored in sequential memory banks of the system memory.

In another embodiment, the texture processing comprises texture filtering and texture blending operations using the retrieved texture data.

In another embodiment, the texture filtering operation comprises one of bilinear and trilinear filtering operations.

In another embodiment, the address modifier unit further receives memory bank information that indicates a number of the memory banks in the system memory that are interleaved.

In another embodiment, the memory bank information is stored in a programmable register that is programmable by the processor over the system bus.

In another embodiment, the system memory includes a memory controller that manages access of the multiple banks of the system memory based on the converted requested address and the memory bank information received from the graphics accelerator unit via the system bus.

In another aspect, the present invention is directed to a method for processing image data in a video graphic image system. The method comprises: storing texture data in a system memory having multiple memory banks in an interleaved arrangement among the multiple memory banks; receiving at a graphic processing unit vertex data from an external source, performing texture processing on the vertex data and generating a requested address of requested texture data based on the vertex data; transmitting a request to the system memory for the texture data corresponding to the requested address; receiving the transmitted request, retrieving the texture data from a memory bank of the interleaved memory banks corresponding to the requested address, and retrieving texture data from other memory banks of the interleaved memory banks; and providing the retrieved texture data to the graphic processing unit.

In one embodiment, storing comprises storing adjacent blocks of texture data sequentially among the multiple memory banks in the interleaved arrangement.

In another embodiment, transmitting a request to the system memory comprises transmitting a single request, and wherein retrieving the texture data and providing the retrieved texture data comprises retrieving and providing multiple blocks of texture data from the multiple memory banks of system memory.

In another embodiment, the method further comprises modifying the requested address prior to transmitting the request, in response to a number of memory banks in the interleaved arrangement.

In another embodiment, the method further comprises receiving memory bank information that indicates the number of the memory banks that are interleaved, and wherein modifying the requested address comprises modifying the requested address in response to the memory bank information.

In another embodiment, the modified requested address indicates a starting bank of the interleaved arrangement of the memory banks of the system memory at which to retrieve texture data.

In another embodiment, retrieving the texture data comprises retrieving texture data stored at like addressable rows of each of the interleaved memory banks.

In another embodiment, the texture data are stored in the system memory according to a texture data map arranged in rows and columns, the rows being indexed by a row coordinate and the columns being indexed by a column coordinate.

In another embodiment, the requested address corresponds to at least one texture data element of a row of the texture data map and wherein texture data elements of neighboring rows of the texture data map are required for the texture processing.

In another embodiment, the interleaved arrangement is configured such that sequential adjacent rows of the texture data map are stored in sequential memory banks of the system memory.

In another embodiment, the texture processing comprises texture filtering and texture blending operations using the retrieved texture data.

In another embodiment, the texture filtering operation comprises one of bilinear and trilinear filtering operations.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 1:
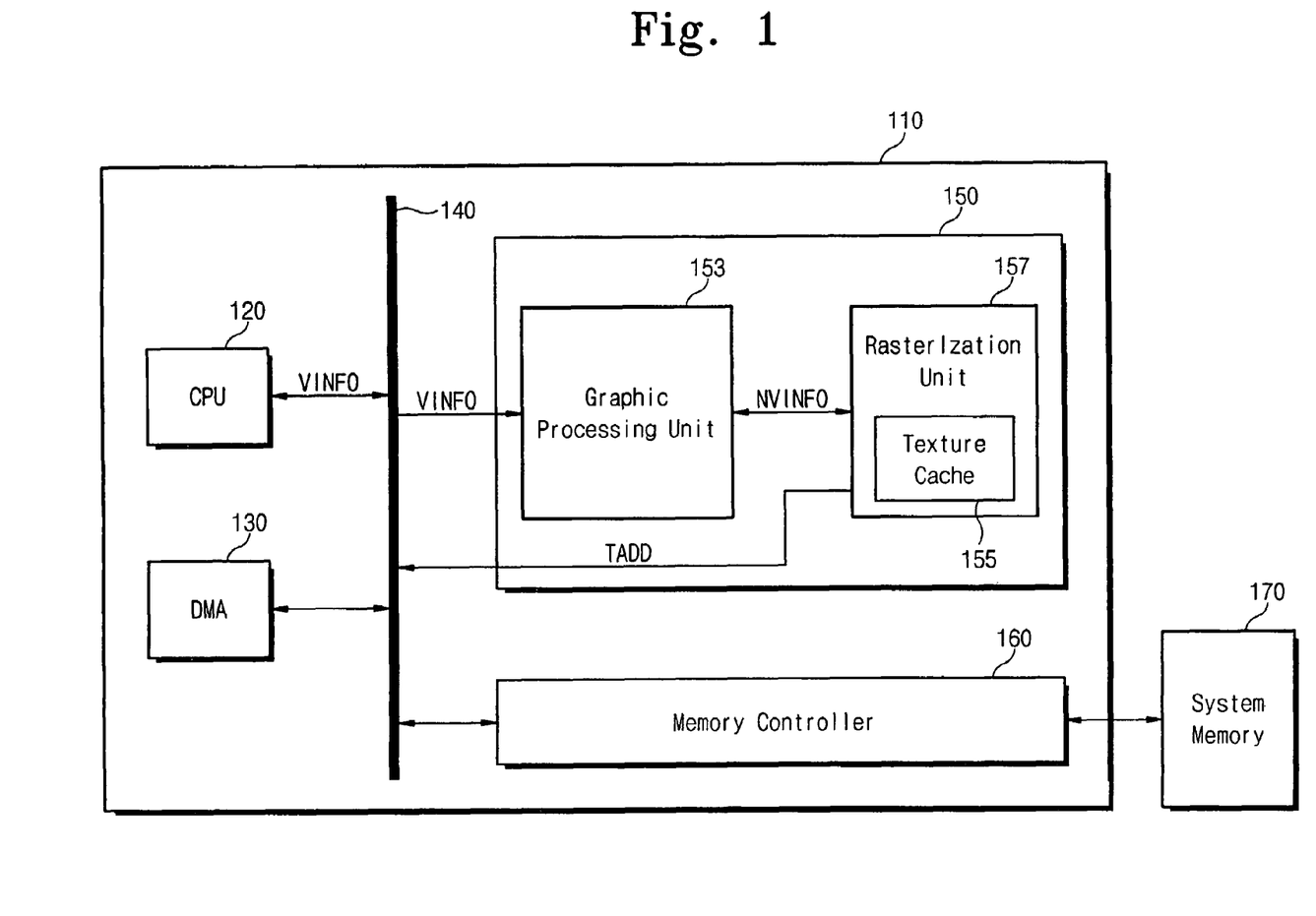
FIG. 1 is a block diagram of a conventional graphic system that performs image texture reproduction.

FIG. 1 is a block diagram of a conventional graphic system that performs image texture reproduction. The conventional graphic system 110 includes a system bus 140 to which a central processing unit 120, a direct memory access controller 130, a graphics accelerator unit 150, and a memory controller 160 are connected. The memory controller 160 manages access to an external system memory 170.

The graphics accelerator 150 includes a graphic processing unit 153 and rasterization unit 157 including a texture cache 155. Texture data are stored in texel form in the system memory 170. The direct memory access controller 130 controls the transfer of data to and from system memory 170 over the system bus 140 as an automated process, with greatly reduced need for CPU access.

When the CPU 120 desires to display an image, vertex information VINFO data is generated and transmitted to the graphic processing unit 153 of the graphics accelerator 150. The VINFO data includes the vertex color, the vertex address, and vertex connection information. The graphic processing unit 153 performs transformation and clipping functions for the received VINFO data. The transformation function relates to translation, rotation, and modulations of the surface color of the vertex of the VINFO data. The clipping function removes portions of the image that are invisible, and therefore do not require rendering, for the purpose of reducing the data size. The graphic processing unit 153 outputs the processed data as processed vertex information data NVINFO data.

The rasterization unit 157 in the graphics accelerator processing unit 150 rasterizes the processed vertex information data NVINFO into an image pixel for display according to the coordinate system of the display. The rasterization unit 157 extracts textural information from the NVINFO data to generate a texture memory address TADD, and fetches, or retrieves, texels from memory according to the texture memory address TADD. The rasterization unit 157 searches the texture cache 155 for texels corresponding to a current desired texture memory address TADD. In the case where the texels corresponding to TADD are available in texture cache 155, the graphic processing unit 153 performs texture filtering using the fetched texels to generate a filtered color and texture blending of the display pixel color with the filtered texture color.

In the case where the desired texels corresponding to the texture memory address TADD are not available in the texture cache 155, access to system memory 170 via the memory controller 160 is required. Such access takes place over the system bus 140, and therefore requires exclusive use of the system bus 140 for a designated time period. The desired texel addressed by the texel address TADD is retrieved, and texels neighboring the desired texel designated by TADD are prefetched into the texture cache 155 from system memory 190 over the serial bus 140. The number of fetched and prefetched texels corresponds to the fixed texture cache block size. This operation makes the prefetched texels readily available in the texture cache 155 for rapid access by the graphic processing unit 153. In a texture cache programmed for stride pattern operation, a single block of texels is retrieved in a single fetch operation. In a texture cache programmed for twiddle pattern operation, two adjacent blocks of texels are retrieved, requiring two fetch operations to be performed.

The texture cache block size determines the number of texel data elements that are fetched from system memory 170 in a single fetching operation. In general, a larger texture cache block size is desired, since more information can be accessed in a fetching operation and therefore made available to the graphic processing unit 153. However, the texture cache block size is restricted by limitations in the size of texture cache 155 due to limited availability of area on the circuit that can be dedicated to texture cache memory.

Figure 2:
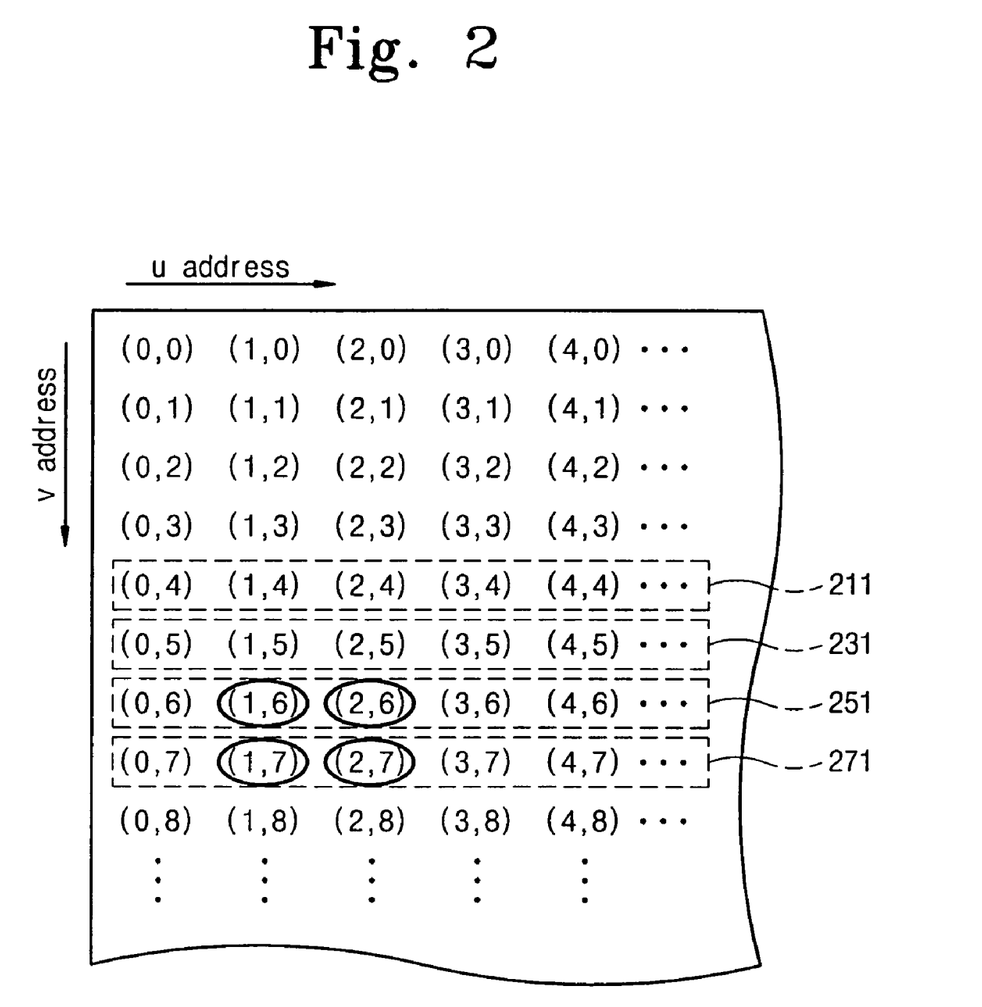
FIG. 2 is a table that illustrates the coordinate system (u, v) of texture data, and illustrates the fetching of 4 neighboring texels arranged in a twiddle storage pattern, in the conventional graphic system of FIG. 1.

FIG. 2 is a table that illustrates the coordinate system (u, v) of texture data as stored in system memory 170, and illustrates, by way of example, the fetching of 4 neighboring texels arranged in a twiddle storage pattern, in the conventional graphic system of FIG. 1. As stated above, texture filtering requires an large amount of system memory access due to the need for fetching texels from the system memory 170. Textures are stored as texel data arranged in (u, v) addressable coordinate space. In the table, each row 211, 231, 251, 271 represents a block of data having a common v address. Each memory access by the texture cache 155 results in the retrieval of one row of data, or one data block. For example, is texture cache 155 requests retrieval of the texel data located at the address designated by (1, 6), then the entire row 251 is retrieved as part of the data fetch, including data texel elements (0, 6), (1, 6), (2, 6), (3, 6), (4, 6) . . . (n, 6), where n represents the number of columns of texel information in a given block, or line.

In a bilinear texture filtering process to be performed by the graphic processing unit 153, four neighboring pixels are required to generate a filtered color corresponding to a screen pixel. For example, a bilinear filtering process may require retrieval of the texel data corresponding to locations (1, 6), (2, 6), (1, 7), (2, 7). Since these texel data are stored on 2 adjacent rows, they are located in two different blocks, and therefore, the texture cache 155 must perform two separate requests for data from the memory controller 160, each request requiring exclusive use of the system bus 140 for a designated time period. In view of this, system bus 140 efficiency is degraded because the texture cache 155 or graphics accelerator 150 will require exclusive use of the system bus 140 until all texture data required for the texture filtering operation are retrieved, and because two separate fetch instructions in the form of read commands are required to obtain the two rows 251, 271 of texel data.

Figure 3:
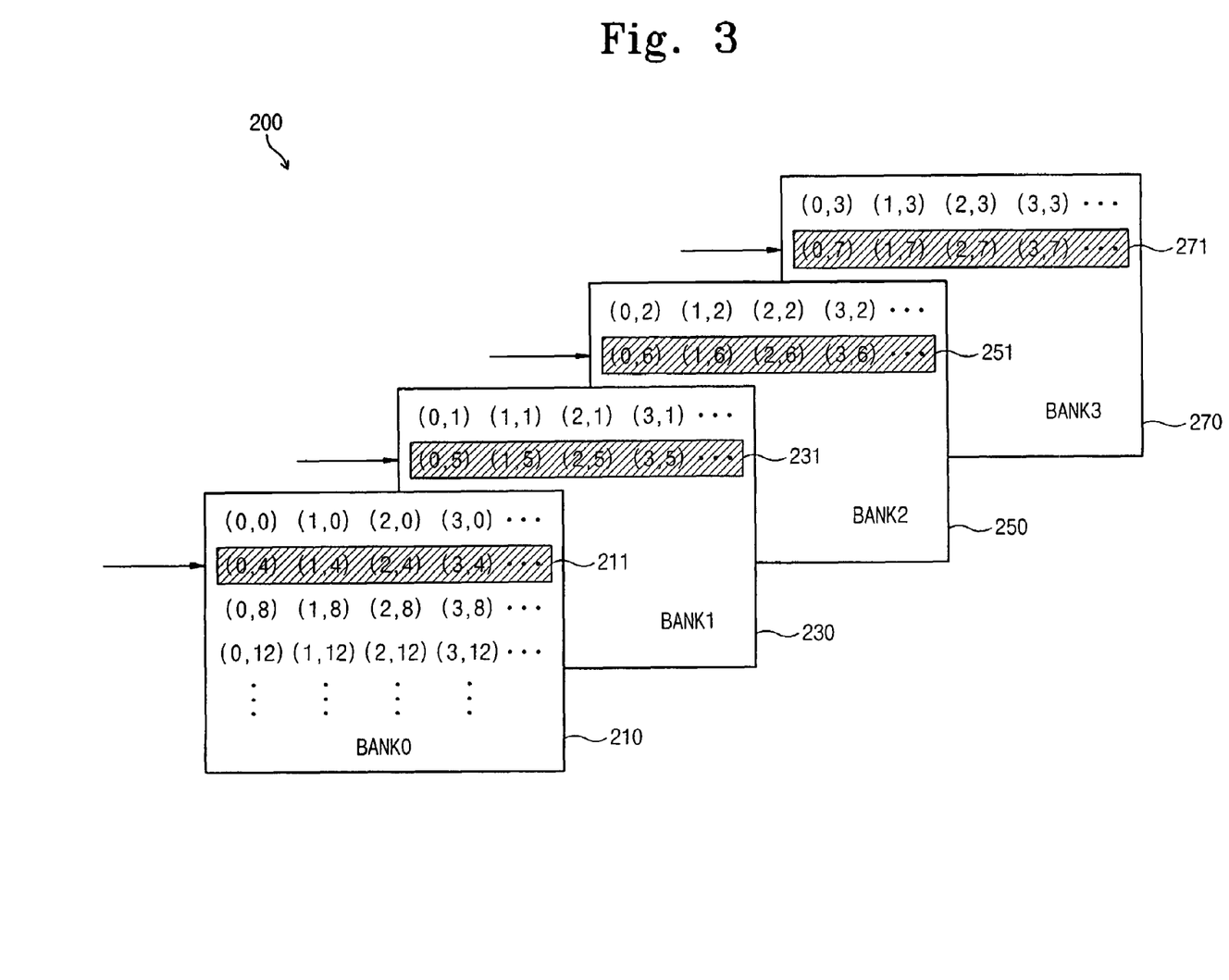
FIG. 3 is a table that illustrates the coordinate system (u, v) of texture data stored in multiple memory banks according to the interleaved arrangement of the present invention.

FIG. 3 is a table that illustrates the coordinate system (u, v) of texture data stored in multiple memory banks according to the interleaved arrangement of the present invention. In contemporary graphic systems, system memory is partitioned into a plurality of banks that are independently addressable. A bank interleaving function can be provided such that data of a common row are read successively among the banks. By utilizing the bank interleaving function, successive data are stored among the multiple banks, in order of the succession of banks. Upon a request for data at a particular memory address, the memory controller can be programmed to fetch n rows of texel data, each from one of the n banks of memory, where n is a positive integer, in response to a single read command from the texture cache or graphic processing unit of the graphics accelerator. In this manner, multiple blocks of data are retrieved from system memory using a single request command. This configuration reduces the number of system bus accesses required for the data retrieval operation, leading to more efficient system operation.

In one example, with reference to FIG. 3, assume that the system memory is partitioned into four banks 200 BANK0, BANK1, BANK2, BANK3 210, 230, 250, 270. Texel data of a first common row (0, 0), (1, 0), (2, 0), (3, 0), . . . are assigned to the first row of the first memory bank BANK0. Texel data of a second common row (0, 1), (1, 1), (2, 1), (3, 1), are assigned to the first row of the second memory bank BANK1. Texel data of a third common row (0, 2), (1, 2), (2, 2), (3, 2), are assigned to the first row of the third memory bank BANK2. Texel data of a fourth common row (0, 3), (1, 3), (2, 3), (3, 3), are assigned to the first row of the fourth memory bank BANK3. Texel data of a fifth common row (0, 4), (1, 4), (2, 4), (3, 4), . . . are assigned to the second row of the first memory bank BANK0. Texel data of a sixth common row (0, 5), (1, 5), (2, 5), (3, 5), are assigned to the second row of the second memory bank BANK1. Texel data of a seventh common row (0, 6), (1, 6), (2, 6), (3, 6), are assigned to the second row of the third memory bank BANK2. Texel data of a eighth common row 0, 7), (1, 7), (2, 7), (3, 7), are assigned to the second row of the fourth memory bank BANK3. This interleaved data storage arrangement continues for all texel data that are stored in memory. That is, individually addressable rows 211, 231, 251, 271 of sequential texel data are stored sequentially among the multiple memory banks 200 BANK0, BANK1, BANK2, BANK3 210, 230, 250, 270.

In this example, if retrieval of one of the texel data elements stored in a bank is required, for example, the texel data element corresponding to address (1, 6), a single read command is transferred via from the texture cache to the memory controller to request the texel data corresponding to that address. In response, the memory controller retrieves all blocks of data 211, 231, 251, 271 among all the memory banks BANK0, BANK1, BANK2, BANK3 210, 230, 250, 270 that have the same addressable row (for example, the second row) in the corresponding memory bank. In this example, four rows of data 211, 231, 251, 271 are therefore retrieved by the memory controller in response to a single read or fetch command received from the texture cache. Thus, the above-described embodiment of the present invention requires a single read command to retrieve four blocks of data from system memory, rather than four read commands, as would be required by the conventional system described above in connection with FIGS. 1 and 2. It therefore follows that a single bus access is required to retrieve four blocks of data from the four memory banks, rather than four bus accesses, as would be the case in the conventional system. The four retrieved blocks 211, 231, 251, 271 are then made available in texture cache, for immediate access by the graphic processing unit. In this manner, more efficient use of bus resources is achieved, leading to an improvement in overall system efficiency.

Figure 4:
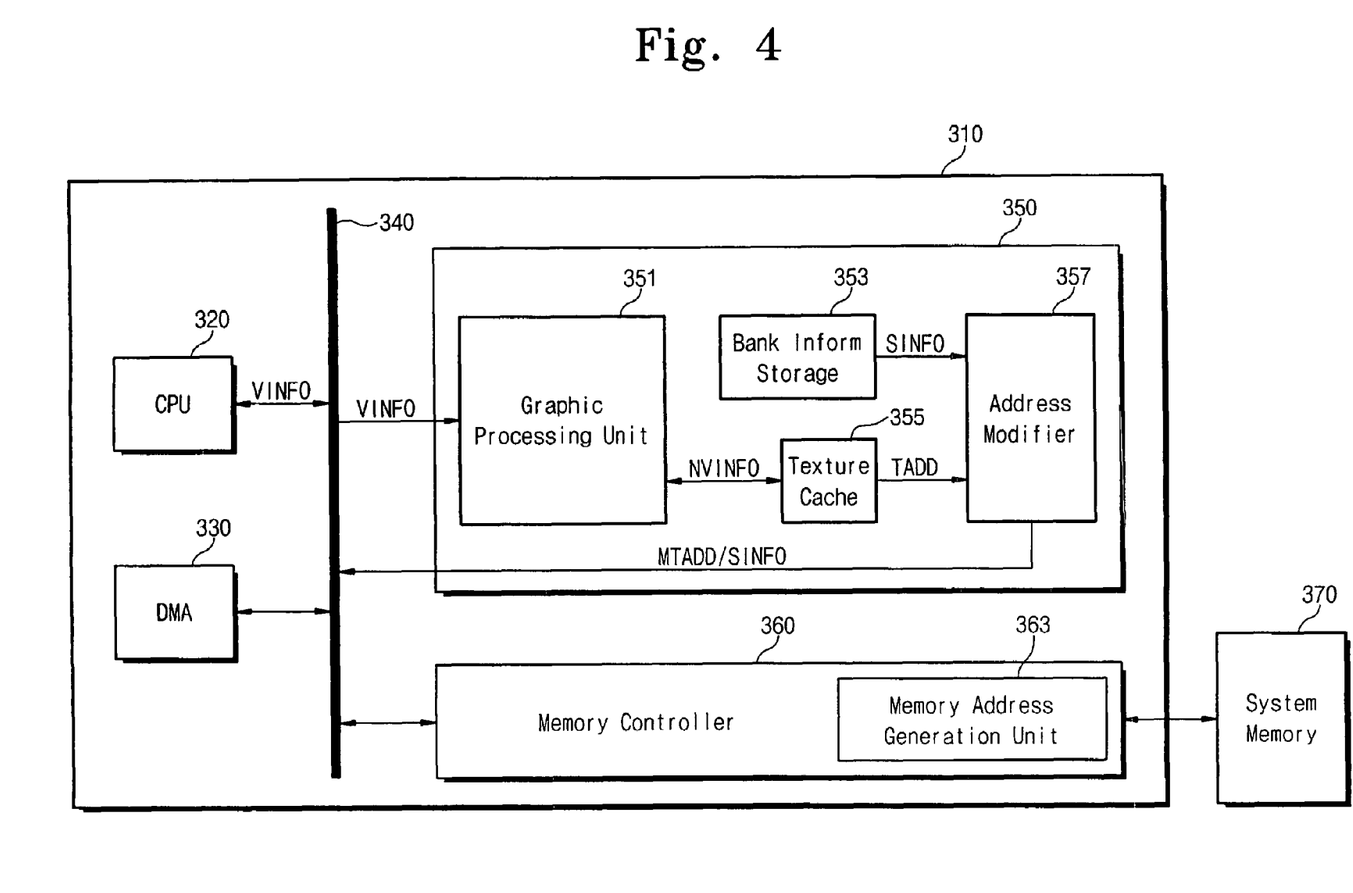
FIG. 4 is a block diagram of an embodiment of a graphic system that performs image texture reproduction in an interleaved texture data storage and retrieval format, in accordance with the present invention.

FIG. 4 is a block diagram of an embodiment of a graphic system that performs image texture reproduction in an interleaved texture data storage and retrieval format, in accordance with the present invention. The graphic system of the present invention 310 includes a system bus 340 to which a central processing unit 320, a direct memory access controller 330, a graphics accelerator unit 350, and a memory controller 360 are connected. The memory controller 360 manages access to an external system memory 370.

The graphics accelerator 350 includes a graphic processing unit 351 and a texture cache 355. Texture data are stored in texel form in the system memory 370. The direct memory access controller 330 controls the transfer of data to and from system memory 370 over the system bus 340 as an automated process.

The graphics accelerator 350 further includes an address modifier unit 357 and a bank information storage register 353. The bank information storage register 353 stores bank information SINFO, related, for example, to the number of banks that are interleaved in system memory 370, and the storage order of the interleaved banks. In one embodiment, the bank information storage register is programmed by the CPU 320 via the system bus 340. The address modifier unit 357 receives the bank information SINFO from the bank information storage register 353 and receives the address of the requested texture data TADD from the texture cache 355, and, in response, generates and transmits a modified texel address MTADD and the bank information SINFO via the system bus 240 to the memory controller 360. The modified texel address MTADD is modified according to the interleaving configuration.

When the CPU 320 desires to display an image, vertex information VINFO data is generated and transmitted to the graphic processing unit 351 of the graphics accelerator 350. The VINFO data includes the vertex color, the vertex address, and vertex connection information. The graphic processing unit 351 performs transformation and clipping functions for the received VINFO data. The transformation function relates to translation, rotation, and modulations of the surface color of the vertex of the VINFO data. The clipping function removes portions of the image that are invisible, and therefore do not require rendering, for the purpose of reducing the data size. A geometry unit in the graphic processing unit 351 outputs the processed data as processed vertex information data NVINFO data.

A rasterization unit in the graphics accelerator 350, for example in the graphic processing unit 351 of the graphics accelerator 350, rasterizes the processed vertex information data NVINFO into an image pixel for display according to the coordinate system of the display. The rasterization unit extracts textural information from the NVINFO data to generate a texture memory address TADD, and fetches texels from memory according to the texture memory address TADD. The graphic processing unit 351 searches the texture cache 355 for texels corresponding to the current desired texture memory address TADD. In the case where the texels corresponding to TADD are available in texture cache 355, the graphic processing unit 351 performs texture filtering using the fetched texels to generate a filtered color and texture blending of the display pixel color with the filtered texture color.

In the case where the desired texels corresponding to the texture memory address TADD are not available in the texture cache 355, a cache miss occurs and access to system memory 370 via the memory controller 360 is required to retrieve the texel data. Such access takes place as a read operation over the system bus 340, and therefore requires exclusive use of the system bus 340 for a designated time period. The desired texel addressed by the texel address TADD is retrieved, and texels neighboring the desired texel designated by TADD are also retrieved into the texture cache 355 from system memory 370 over the serial bus 340. According to the present invention, an entire row of texels of a row of the memory bank containing the desired texel is retrieved. Also retrieved in the same read operation are the texel data of the same physical rows of the other memory banks. For example, if a texel of row 251 of FIG. 3 is desired, then rows 211, 231, 251, and 271 of the first through fourth memory banks 210, 230, 250, 270 are retrieved in the same, single, read operation. This operation makes the fetched texels readily available in the texture cache 355 for rapid access by the graphic processing unit 353.

In one embodiment, the texture cache 355 is not aware that the texel data are stored in system memory 370 in an interleaved data storage format. Therefore, the requested texel address TADD does not take the interleaved data storage format into account. The address modifier unit 357 receives the requested texel address TADD and performs a conversion to generate a modified texel address MTADD that is representative of the interleaved data storage format. For example, the modified texel address MTADD can indicate the initial bank in the interleaved bank arrangement from which texel data are to be read, for example the first bank BANK0. A single memory read command is generated by the graphics accelerator, and n blocks, or rows, of texel data are retrieved from memory based on the single read command, where n represents the number of banks used in the interleaved data storage format. The single read command includes the modified texel address MTADD and the bank information SINFO. The read command is passed via the system bus 340 to the memory controller 360. The memory controller 360 includes a memory address generation unit 363 that recovers the address at which the requested data are stored in system memory 370, based on the received modified texel address MTADD and the bank information SINFO. The memory controller 360 reads successive texels of the plurality of interleaved banks, beginning with the start, or initial, bank of the interleaved memory banks, for example BANK0. An exemplary description of the manner in which the modified texel address MTADD is generated by the memory address generation unit 363 based on the bank information SINFO data and the requested texel address TADD is provided below in connection with FIG. 5.

Figure 5:
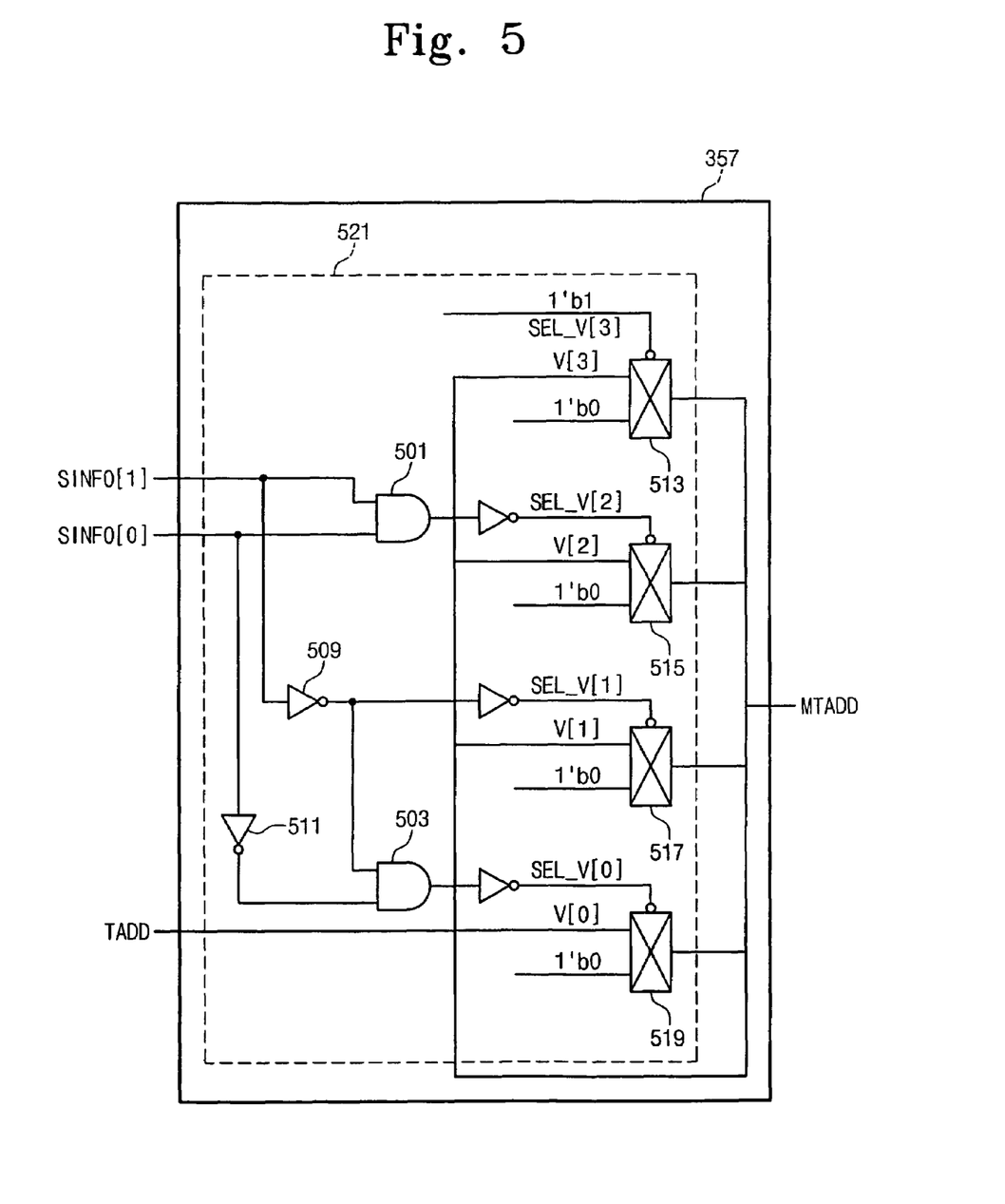
FIG. 5 is a block diagram of an embodiment of an address modifier of the graphic system of FIG. 4, in accordance with the present invention.

FIG. 5 is a schematic diagram of an embodiment of the address modifier 357 applicable to the above example. The address modifier 357 receives the texel address TADD and the bank information SINFO[1,0], and generates a modified texel address MTADD. The embodiment shown includes first and second AND gates 501, 503 and first and second inverters 509, 511, that collectively form combinatorial logic 521. The combinatorial logic 521 receives the two bank information bits SINFO[1], SINFO[2], and decodes the bits to provide four select signals SEL_V[3], SEL_V[2], SEL_V[1], SEL_V[0]. In this example, in the case where no-bank interleaving is active, the select signals SEL_V[3], SEL_V[2], SEL_V[1], SEL_V[0] are 1111. Assuming two-bank interleaving is active, the select signals SEL_V[3], SEL_V[2], SEL_V[1], SEL_V[0] are 1110. Assuming four-bank interleaving is active, the select signals SEL_V[3], SEL_V[2], SEL_V[1], SEL_V[0] are 1100. Assuming eight-bank interleaving is active, the select signals SEL_V[3], SEL_V[2], SEL_V[1], SEL_V[0] are 1000.

The select signals SEL_V[3], SEL_V[2], SEL_V[1], SEL_V[0] are applied as active-low select inputs to each of four respective selectors, or 2:1 multiplexers 513, 515, 517, 519. The four least significant bits V[3 . . . 0] of the texel address signal TADD are applied as first inputs to the four respective selectors 513, 515, 517, 519. Second inputs of the four respective selectors are tied to ground, or a zero binary value. The output terminals of the four selectors 513, 515, 517, 519, in combination, provide the four least significant bits of the modified texel address signal MTADD.

Figure 6:
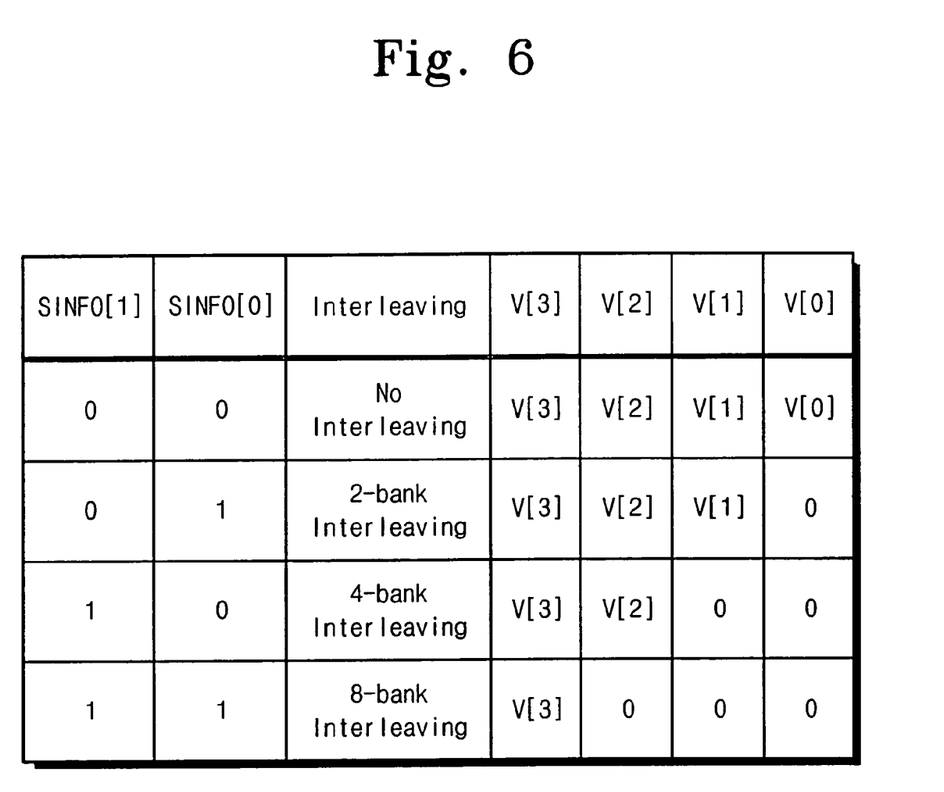
FIG. 6 is a table of the bit values assigned to the modified texel address MTADD, in response to certain received bits of the texel address TADD and the bank information SINFO in accordance with the present invention.

FIG. 6 is a table of the bit values assigned by the address modifier 357 to the modified texel address MTADD, in response to certain received bits of the texel address TADD and the bank information SINFO in accordance with the present invention. Referring to the table of FIG. 6, if no bank interleaving is active, all four least significant bits V[3], V[2], V[1], V[0] of the texel address TADD are transferred to the four least significant bits of the modified texel address MTADD[3 . . . 0] signal. If two bank interleaving is active, the least significant bit V[0] of the texel address signal TADD is dropped, so that the least significant bit of the modified texel address signal MTADD[0] is assigned a binary value of zero, and the three next least significant bits V[3], V[2], V[1], of the texel address TADD are transferred to the three next least significant bits of the modified texel address signal MTADD [3, 2, 1]. If four bank interleaving is active, the two least significant bits V[1], V[0] of the texel address signal TADD are dropped, so that the two least significant bits of the modified texel address signal MTADD[1,0] are assigned a binary value of zero, and the two next least significant bits V[3], V[2] of the texel address TADD are transferred to the two next least significant bits of the modified texel address signal MTADD[3, 2]. If eight bank interleaving is active, the three least significant bits V[2], V[1], V[0] of the texel address signal TADD are dropped, so that the three least significant bits of the modified texel address signal MTADD[2, 1,0] are assigned a binary value of zero, and the next least significant bit V[3] of the texel address TADD is transferred to the next least significant bit of the modified texel address signal MTADD[3]. In all cases, the remaining bits TADD [x . . . 3] of the texel address signal TADD remain unchanged in the modified texel address signal MTADD [x . . . 3].

A read command is thus generated by the graphics accelerator unit 350 that includes the modified texel address signal MTADD, and, optionally, the bank information SINFO that is transferred to the memory controller 360 via the system bus 340. Depending on the application, the address modifier 357 can reside in a number of locations on the graphics accelerator unit 350. For example, the address modifier 357 can reside as an independent unit on the graphics accelerator unit 350, can reside in the texture cache 355, or in some systems that do not include texture cache 275, the address modifier 357 can reside in the graphic processor unit 351.

It would be apparent to one of skill in the art that many different types of circuits, including programmable controllers or processors with look-up tables, can be utilized for generating the modified texel address MTADD in response to the input texel address TADD and bank information SINFO signals. The present invention is not limited to the embodiment shown in FIGS. 4-6, but rather encompasses all variations of such circuits for providing a modified texel address MTADD signal.

Figure 7:
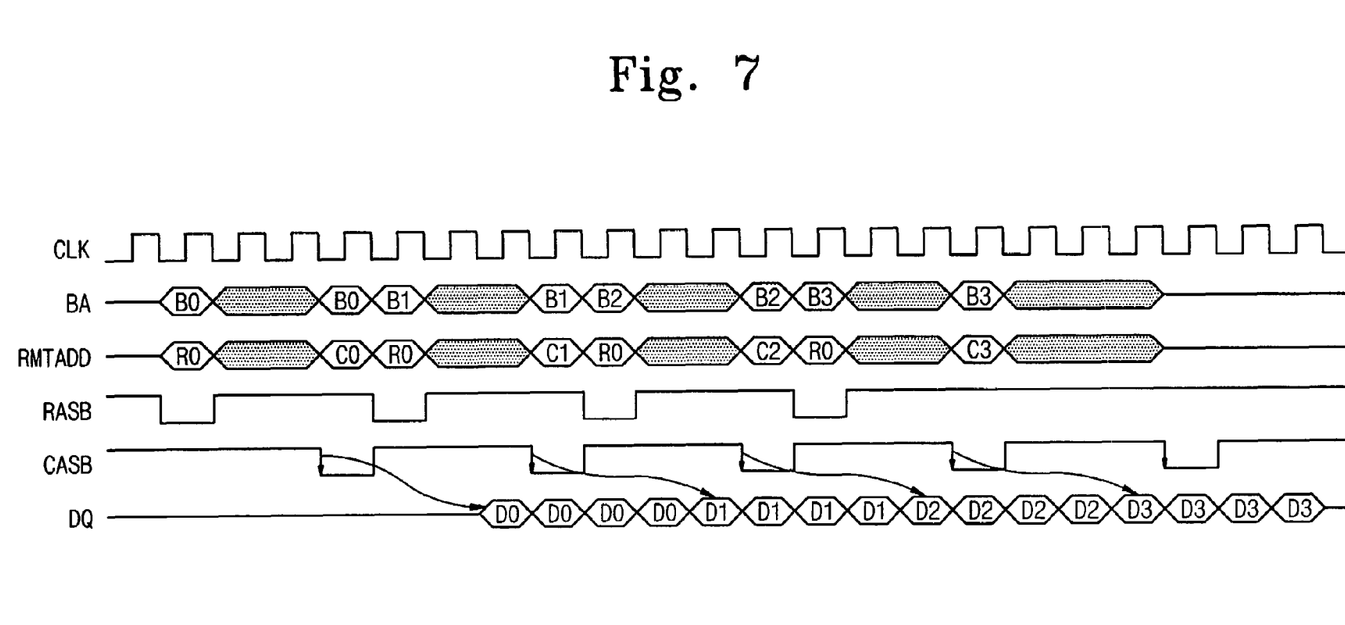
FIG. 7 is a timing diagram of the operation of the memory controller in response to a received read command, in accordance with the present invention.

FIG. 7 is a timing diagram of the operation of the memory controller 360 in response to a received read command, in accordance with the present invention. In response to the received read command including the modified texel address signal MTADD and the bank information signal SINFO, the memory controller 360 and memory address generation unit 363 generate a bank address signal BA, a recovered modified texel address signal RMTADD, a row access strobe RASB and a column access strobe CASB, among other signals, for retrieving data from the system memory 370. The present example assumes four-bank interleaving is active and assumes a data burst length of 4, where data burst length is related to the data block size or number of texel data elements that belong to a common row. In this example, the same address is accessed in each of the four data banks containing the interleaved data. Namely the data located at (row0, column0), (row0, column1), (row0, column2), (row0, column3) are accessed in each of the four memory bank addresses B0, B1, B2, B3. Therefore, texel data D0, D0, D0, D0 of the $0^{th}$ row of the $0^{th}$ memory bank are accessed, followed by texel data D1, D1, D1, D1 of the $0^{th}$ row of the first memory bank, followed by texel data D2, D2, D2, D2 of the $0^{th}$ row of the second memory bank, followed by texel data D3, D3, D3, D3 of the $0^{th}$ row of the third memory bank.

In this manner, multiple rows or blocks of texel data are retrieved from the system memory 370 in response to a single data read request by the graphics accelerator unit 350. This is advantageous in that, following transmission of the single read command from the graphics accelerator unit 350 to the memory controller 360 via the system bus 340, the system bus is no longer occupied by the graphics accelerator unit 350. What would otherwise require multiple read commands in a conventional system, and therefore multiple accesses of the system bus 340, instead, according to the present invention, requires a single bus access for retrieving multiple rows or blocks of texel data that are interleaved among multiple memory banks. System bus efficiency is greatly improved, since system bus cycles are made available to other system bus masters while texel data are fetched from the multiple interleaved banks of system memory 370 by the memory controller 360.

Figure 8:
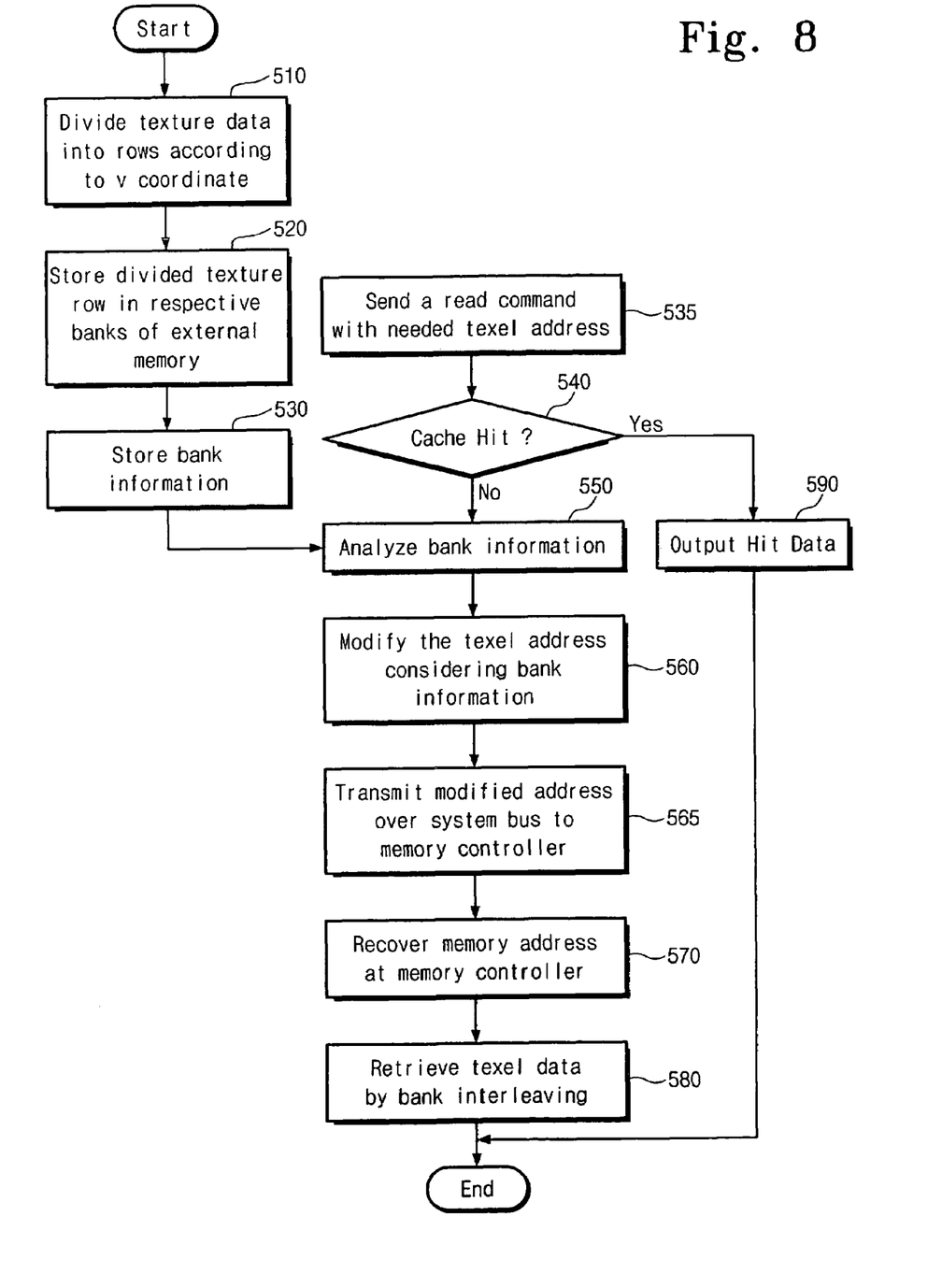
FIG. 8 is a flow diagram of a method of storing and recovering texture data from system memory in a graphic system that performs texture processing, in accordance with the present invention.

FIG. 8 is a flow diagram of a method of storing and recovering texture data from system memory in a graphic system that performs texture data processing in accordance with the present invention. Initially, texture data are divided or partitioned into rows according to their respective v coordinates (step 510). The sequential rows of texture data are then stored in interleaved format among multiple respective banks of system memory 370 (step 520) under control of the central processing unit (CPU) 320. The bank information, for example, bank information SINFO described above as containing information related to the number of interleaved banks associated with the stored data, is also stored for further use (step 530). According to the present invention, any time texel data are accessed, stored, or updated during system operation, they are accessed, stored or modified in accordance with the interleaved memory bank arrangement.

During system operation, texel data stored in the system memory 370 at a certain address are desired. Accordingly, the graphic processing unit 351 requests the texel data associated with the address and sends a read command with the needed texel address (step 535). The texture cache 355 is examined for texture data corresponding to the extracted texel address (step 540). If the texture data corresponding to the desired texel address are present in the texture cache, a cache hit occurs, and the requested texture data corresponding to the texel address are output to the requesting unit, for example graphic processing unit 351 (step 590).

If a cache hit does not occur, the bank information SINFO associated with the texel address TADD is analyzed (step 550). In one example, the bank information provides the number of memory banks in system memory that are interleaved, as described above. The texel address TADD is then modified to provide a modified texel address MTADD that takes into consideration the bank information SINFO (step 560), for example, in the manner described above. The modified texel address MTADD is transmitted over the system bus to the memory controller in connection with a single read command (step 565). The memory controller receives the read command including the modified texel address, and generates a recovered modified texel address RMTADD (step 570). The desired texel data are then retrieved from the multiple interleaved memory banks of the system memory and provided to the graphics accelerator unit 350 in response to the single read command (step 580).

In this manner, the present invention provides systems and methods for graphic reproduction of an image including textural information where multiple rows or blocks of texture data can be retrieved from system memory in response to the single read command. In this manner, efficient use of system bus is achieved, and an increase in the texture cache hit ratio is realized, leading to more efficient system operation, and reduced system bus usage for texture data retrieval.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A graphics accelerator in a video graphics system comprising:
a graphic processing unit that receives vertex data from an external source, that performs texture processing on the vertex data and that generates a requested address of requested texture data based on the vertex data;
an address modifier unit that receives the requested address corresponding to the requested texture data to be accessed in a system memory from the graphic processing unit to perform the texture processing, the system memory having multiple individually accessible memory banks in which texture data are stored in an interleaved arrangement, the address modifier converting the requested address to generate a converted requested address that is transmitted to access multiple banks of the system memory such that requested texture data corresponding to the requested address are retrieved, and such that additional texture data from the other memory banks in the interleaved arrangement are retrieved, wherein the address modifier unit further receives memory bank information that indicates a number of the memory banks in the system memory that are interleaved.

2. The graphics accelerator of claim 1 further comprising a texture cache unit that receives the requested address and examines its contents for texture data corresponding to the requested address, and, in the event that the texture data corresponding to the requested address are present in the texture cache, the texture data are retrieved from the texture cache unit and returned to the graphics processing unit.

3. The graphics accelerator of claim 2 wherein the texture cache unit, further, in the event that the texture data corresponding to the requested address are not present in the texture cache, initiates a fetch of texture data corresponding to the requested address from the system memory to retrieve the texture data corresponding to the requested address to the texture cache unit, the address modifier converting the requested address to generate the converted requested address that is transmitted to retrieve texture data from the multiple banks of the system memory.

4. The graphics accelerator of claim 1 wherein the converted requested address indicates a starting bank of the interleaved arrangement of the memory banks of the system memory at which to retrieve texture data.

5. The graphics accelerator of claim 1 wherein the texture data are arranged in the system memory in a texture data map according to rows and columns, the rows being indexed by a row coordinate and the columns being indexed by a column coordinate.

6. The graphics accelerator of claim 5 wherein the requested address corresponds to at least one texture data element of a row of the texture data map and wherein texture data elements of neighboring rows of the texture data map are required for the texture processing.

7. The graphics accelerator of claim 6 wherein the interleaved arrangement is configured such that sequential adjacent rows of the texture data map are stored in sequential memory banks of the system memory.

8. The graphics accelerator of claim 1 wherein the texture processing comprises texture filtering and texture blending operations using the retrieved texture data.

9. The graphics accelerator of claim 8 wherein the texture filtering operation comprises one of bilinear and trilinear filtering operations.

10. The graphics accelerator of claim 1 wherein the memory bank information is stored in a programmable register that is programmable by the external source over a system bus to which the graphics accelerator is coupled.

11. video graphics system comprising:
a processor that generates image data including texture information;
a system memory including multiple individually accessible memory banks in which texture data are stored in an interleaved arrangement; and
a graphics accelerator unit in communication with the processor and the system memory via a system bus, the graphics accelerator unit comprising:
a graphic processing unit that receives vertex data from the processor, that performs texture processing on the vertex data and that generates a requested address of requested texture data based on the vertex data; and
an address modifier unit that receives the requested address corresponding to the requested texture data to be accessed in the system memory from the graphic processing unit to perform the texture processing, the address modifier converting the requested address to generate a converted requested address that is transmitted to access multiple banks of the system memory such that requested texture data corresponding to the requested address are retrieved, and such that additional texture data from the other memory banks in the interleaved arrangement are retrieved, wherein the address modifier unit further receives memory bank information that indicates a number of the memory banks in the system memory that are interleaved.

12. The system of claim 11 further comprising a texture cache unit that receives the requested address and examines its contents for texture data corresponding to the requested address, and, in the event that the texture data corresponding to the requested address are present in the texture cache, the texture data are retrieved from the texture cache unit and returned to the graphics processing unit.

13. The system of claim 12 wherein the texture cache unit, further, in the event that the texture data corresponding to the requested address are not present in the texture cache, initiates a fetch of texture data corresponding to the requested address from the system memory to retrieve the texture data corresponding to the requested address to the texture cache unit, the address modifier converting the requested address to generate the converted requested address that is transmitted to retrieve texture data from the multiple banks of the system memory.

14. The system of claim 11 wherein the converted requested address indicates a starting bank of the interleaved arrangement of the memory banks of the system memory at which to retrieve texture data.

15. The system of claim 11 wherein the texture data are arranged in the system memory in a texture data map according to rows and columns, the rows being indexed by a row coordinate and the columns being indexed by a column coordinate.

16. The system of claim 15 wherein the requested address corresponds to at least one texture data element of a row of the texture data map and wherein texture data elements of neighboring rows of the texture data map are required for the texture processing.

17. The system of claim 16 wherein the interleaved arrangement is configured such that sequential adjacent rows of the texture data map are stored in sequential memory banks of the system memory.

18. The system of claim 11 wherein the texture processing comprises texture filtering and texture blending operations using the retrieved texture data.

19. The system of claim 18 wherein the texture filtering operation comprises one of bilinear and trilinear filtering operations.

20. The system of claim 11 wherein the memory bank information is stored in a programmable register that is programmable by the processor over the system bus.

21. The system of claim 11 wherein the system memory includes a memory controller that manages access of the multiple banks of the system memory based on the converted requested address and the memory bank information received from the graphics accelerator unit via the system bus.

22. A method for processing image data in a video graphic image system comprising:
    storing texture data in a system memory having multiple memory banks in an interleaved arrangement among the multiple memory banks;
    receiving at a graphic processing unit vertex data from an external source, performing texture processing on the vertex data and generating a requested address of requested texture data based on the vertex data;
    transmitting a request to the system memory for the texture data corresponding to the requested address;
    receiving the transmitted request, retrieving the texture data from a memory bank of the interleaved memory banks corresponding to the requested address, and retrieving texture data from other memory banks of the interleaved memory banks;
    providing the retrieved texture data to the graphic processing unit; and
    modifying the requested address prior to transmitting the request, in response to a number of memory banks in the interleaved arrangement.

23. The method of claim 22 wherein storing comprises storing adjacent blocks of texture data sequentially among the multiple memory banks in the interleaved arrangement.

24. The method of claim 22 wherein transmitting a request to the system memory comprises transmitting a single request, and wherein retrieving the texture data and providing the retrieved texture data comprises retrieving and providing multiple blocks of texture data from the multiple memory banks of system memory.

25. The method of claim 22 further comprising receiving memory bank information that indicates the number of the memory banks that are interleaved, and wherein modifying the requested address comprises modifying the requested address in response to the memory bank information.

26. The method of claim 22 wherein the modified requested address indicates a starting bank of the interleaved arrangement of the memory banks of the system memory at which to retrieve texture data.

27. The method of claim 22 wherein retrieving the texture data comprises retrieving texture data stored at like addressable rows of each of the interleaved memory banks.

28. The method of claim 22 wherein the texture data are stored in the system memory according to a texture data map arranged in rows and columns, the rows being indexed by a row coordinate and the columns being indexed by a column coordinate.

29. The method of claim 28 wherein the requested address corresponds to at least one texture data element of a row of the texture data map and wherein texture data elements of neighboring rows of the texture data map are required for the texture processing.

30. The method of claim 29 wherein the interleaved arrangement is configured such that sequential adjacent rows of the texture data map are stored in sequential memory banks of the system memory.

31. The method of claim 22 wherein the texture processing comprises texture filtering and texture blending operations using the retrieved texture data.

32. The method of claim 31 wherein the texture filtering operation comprises one of bilinear and trilinear filtering operations.

* * * * *

UNITED STATES PATENT AND TRADEMARK OFFICE
CERTIFICATE OF CORRECTION

PATENT NO. : 7,580,042 B2 Page 1 of 1
APPLICATION NO. : 11/415721
DATED : August 25, 2009
INVENTOR(S) : Chung et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 593 days.

Signed and Sealed this

Fourteenth Day of September, 2010

David J. Kappos
*Director of the United States Patent and Trademark Office*